(No Model.)

J. H. VINTON.
RATCHET DRILL.

No. 295,694. Patented Mar. 25, 1884.

WITNESSES
Fred. Harris
Fred. P. Dolan

INVENTOR
John H. Vinton
by his attys
Clarke & Raymond

UNITED STATES PATENT OFFICE.

JOHN H. VINTON, OF BOSTON, MASSACHUSETTS, ASSIGNOR TO THE ASHCROFT MANUFACTURING COMPANY, OF SAME PLACE.

RATCHET-DRILL.

SPECIFICATION forming part of Letters Patent No. 295,694, dated March 25, 1884.

Application filed October 13, 1883. (No model.)

*To all whom it may concern:*

Be it known that I, JOHN H. VINTON, of Boston, in the county of Suffolk and State of Massachusetts, a citizen of the United States, have invented certain new and useful Improvements in Ratchet-Drills, of which the following is a full, clear, and exact description, reference being had to the accompanying drawings, forming a part of this specification, in explaining its nature, in which—

Figure 1:
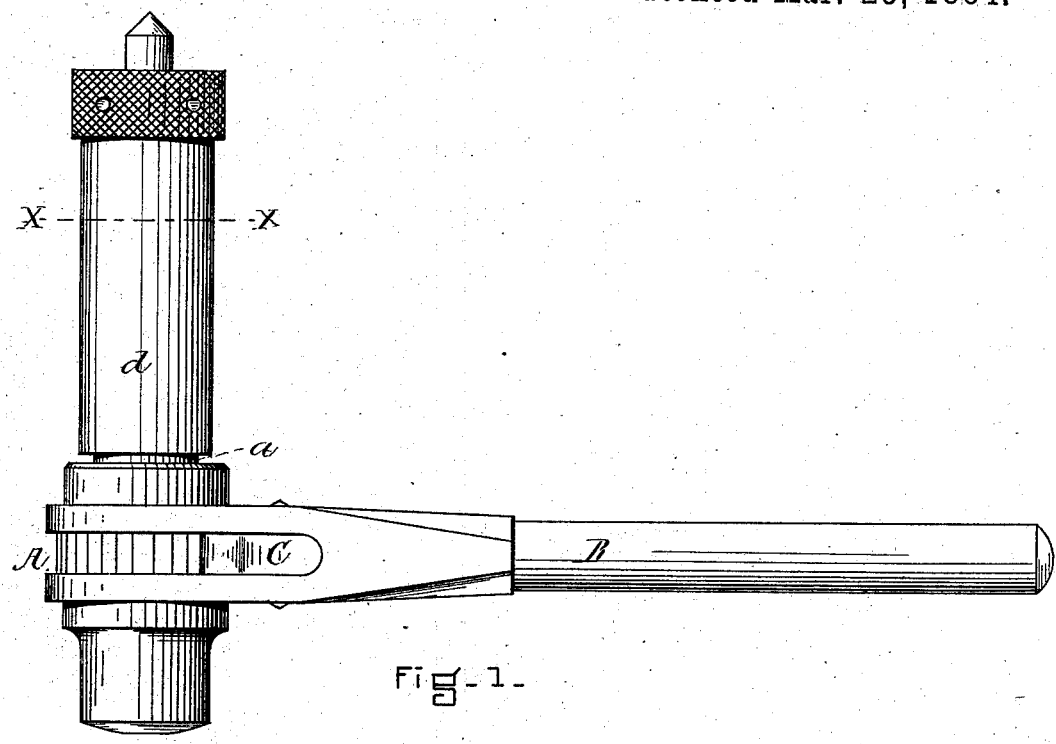
Figures 2, 3:
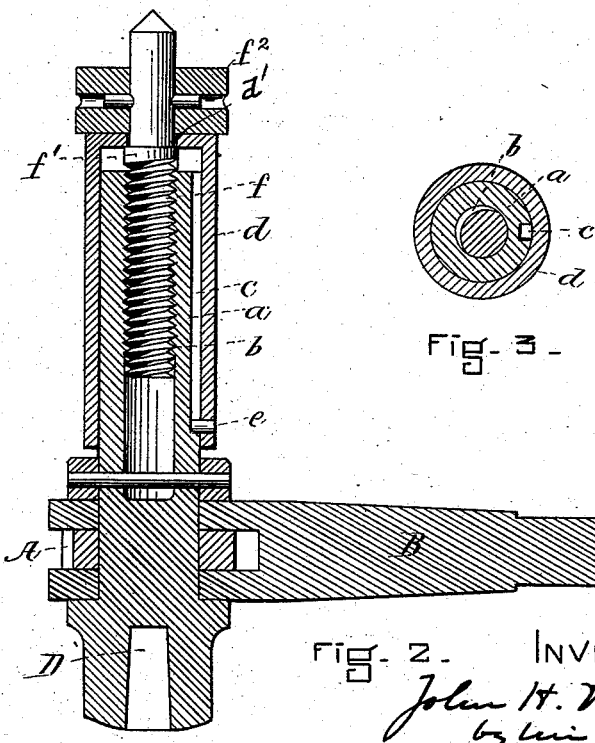

Figure 1 is a side elevation of a drill having my improvement. Fig. 2 is a vertical section thereof, and Fig. 3 is a cross-section on the line $x\ x$ of Fig. 1.

The invention relates, especially, to the portion of a ratchet-drill known as the "feeding device;" and it consists in attaching the feeding-screw to the sleeve or cap covering the nut in such a manner that the screw may be revolved independently of the sleeve or cap, and the sleeve or cap given a vertical movement upon the stem part or nut in which the screw works.

In the ordinary ratchet-drill the sleeve or cap and the feeding-screw inclosed by it are rigidly united at their ends, and it requires very nice fitting of the parts to adjust the feeding-screw to the screw of the hole in the post or nut, and at the same time accurately fit the sleeve or cap to the post or nut, so that there shall be no binding action of the feeding-screw or cap upon the post or nut as they are revolved. This nice fitting of course can be done, but only by skilled workmen, and at a considerable expense; and, moreover, as these drills are subjected to rough usage, there is great liability of the post or feeding-screw or cap becoming a little out of line, or bent, in relation to each other, and if this occurs the cap binds upon the post and works hard thereon. My invention does not require this exact fitting, and cannot easily be got out of order, because the feeding-screw does not hold a rigid relation to the outer sleeve or cap, but being fitted loosely thereto, and not being operated thereby, but by a nut upon its end, the cap or sleeve finds its bearing upon the post, while the screw is free to center itself in the screw-hole in the post or nut.

Referring to the drawings, $a$ represents the post or nut; $b$, the screw-hole therein. $c$ represents a longitudinal groove or recess in the post or nut. $d$ is the cap or sleeve which fits the post or nut, and $e$ is a pin which projects from the inner surface of the sleeve or cap into the recess or groove $c$ in the post, and prevents the sleeve or cap from turning thereon while it is being moved. $f$ is the feeding-screw. $f'$ is a shoulder thereon, and $f^2$ the thumb disk or knob by which the feeding-screw is revolved. This thumb-disk is near the end of the screw, and is of about the same diameter as the sleeve or cap. It is pinned to the end of the screw, and in connection with the shoulder $f'$ loosely fastens the sleeve or cap to the screw. The hole $d'$, through which the screw extends, is made a little larger than the screw, to permit a slight play of the screw therein. This play of the feeding-screw in the cap or sleeve permits it to follow the thread in the post or nut hole without binding.

The other parts of the drill, to which the improvement in this case is applied, are like, in construction, the common ratchet-drill of this class, of which A is the ratchet-wheel; B, the handle; C, the spring-pawl; D, the socket for holding the drill.

It will be observed that in use this feeding-screw is operated by the thumb-disk $f^2$, and the cap is not revolved on the nut, but simply slides longitudinally thereon, and that as the cap has this movement, and as the feeding-screw is loosely attached to it, the cap cannot be so wedged by dirt as to run hard.

Having thus fully described my invention, I claim and desire to secure by Letters Patent of the United States—

1. In a ratchet-drill, the combination of the post or nut $a$, having the groove or recess $c$ and threaded hole $b$, with the sleeve or cap $d$, having the pin $e$, and the feeding-screw $f$, loosely secured to the sleeve, and adapted to be revolved therein, all substantially as and for the purposes described.

2. The combination of the post or nut $a$, having the screw-threaded hole $b$, with the sleeve or cap $d$ and a feeding-screw, $f$, loosely attached to the sleeve or cap, and adapted to screw into the threaded hole $a$, all substantially as and for the purposes described.

3. In a ratchet-drill, the combination of the post or nut $a$, having the screw-threaded hole $b$, the sleeve or cap $d$, and feeding-screw $f$, adapted to screw into the nut $a$, and the thumb-disk $f^2$, all substantially as and for the purposes described.

4. In a ratchet-drill, the combination of the drill-stock D, ratchet-wheel A, handle B, spring-pawl C, and the feeding device described, comprising the nut $a$, the cap or sleeve $d$, feeding-screw $f$, loosely attached to the sleeve or cap $d$, and the thumb-disk $f^2$, all substantially as and for the purposes described.

JOHN H. VINTON.

Witnesses:
F. F. RAYMOND, 2d,
FRED. HARRIS.